United States Patent [19]

Saegusa

[11] Patent Number: 5,692,224
[45] Date of Patent: Nov. 25, 1997

[54] INFORMATION SETTING DEVICE OF A CAMERA

[75] Inventor: Takashi Saegusa, Kanagawa-ken, Japan

[73] Assignee: Nikon Corporation, Tokyo, Japan

[21] Appl. No.: 630,331

[22] Filed: Apr. 10, 1996

[30] Foreign Application Priority Data

Jun. 13, 1995 [JP] Japan ................................. 7-146098

[51] Int. Cl.⁶ ........................................... G03B 17/36
[52] U.S. Cl. ........................ 396/207; 396/284; 396/300
[58] Field of Search ........................ 354/21, 217, 412; 358/906; 396/207, 208, 209, 284, 300

[56] References Cited

U.S. PATENT DOCUMENTS

| | | | |
|---|---|---|---|
| 4,173,401 | 11/1979 | Harvey | 354/21 |
| 4,456,931 | 6/1984 | Toyoda et al. | 358/906 X |
| 4,978,982 | 12/1990 | Ishikawa et al. | 354/21 |
| 5,142,310 | 8/1992 | Taniguchi et al. | 354/21 X |
| 5,289,216 | 2/1994 | Ohsawa et al. | 354/21 |
| 5,389,983 | 2/1995 | Tsunefuji | 354/21 |

FOREIGN PATENT DOCUMENTS 6-77124  3/1994  Japan .

Primary Examiner—W. B. Perkey
Attorney, Agent, or Firm—Oliff & Berridge

[57] ABSTRACT

To cope with undefined codes of coded information, an information setting device is provided having a code read-in device, a memory device to store information corresponding to the codes, and an information reading device to read information from the memory device corresponding to the codes read by the code reading device. The memory device of the information setting device of a camera which sets information read from the information reading device in the camera can be an information overwritable memory device having an information storage area for undefined codes where information is not set.

21 Claims, 6 Drawing Sheets

1

INFORMATION SETTING DEVICE OF A CAMERA

BACKGROUND OF THE INVENTION

1. Field of the Invention

The present invention relates to an information setting device of a camera which reads and sets coded information in a camera.

2. Description of Related Art

An information setting device is known which reads ISO sensitivity, the number of the shootable frames, latitude and the like that are recorded on a film cartridge and automatically sets it in the camera.

The codes indicating the number of the shootable frames, for example, include defined codes for which a specific number of the shootable frames are set in the information setting device and undefined codes for which the number of the shootable frames has not been set initially in the information setting device, as described in Table 1.

TABLE 1

| Code | Content |
|------|---------|
| 1 | 12 frames |
| 2 | 20 frames |
| 3 | 24 frames |
| 4 | 36 frames |
| 5 | Undefined |
| 6 | Undefined |
| 7 | 72 frames |

However, such information setting device of a camera has a problem in that it cannot deal with film with new specifications for which undefined codes are set.

For the defined and undefined codes indicating the number of the shootable frames, Japanese Laid-Open Patent Publication Hei 6-77124 proposes a method in which, if the number of shootable frames is defined, the number of shootable frames is set in the film counter with the number being decreased by one each time a picture is taken (hereafter referred to as reverse counting), and if the number of shootable frames is undefined, the number of shootable frames is set to 0 in the film counter and the number is incremented each time a picture is taken (hereafter referred to as normal counting).

This information setting device of a camera has the problem that a user is easily confused because the film counter display method changes depending on the film being mounted.

SUMMARY OF THE INVENTION

It is an object of the present invention to provide an information setting device for a camera capable of dealing with undefined codes of coded information.

In order to accomplish this and other objectives, according to a first aspect of the invention, an information setting device is provided comprising a code read-in means to read codes, a memory means to store information corresponding to the codes, and an information read-out means to read from the memory means information corresponding to the codes read in by the code read-in means. The information setting device of a camera sets the information read from the information read-out means in the camera. The memory means is an information overwritable memory means and provides a data storage area for undefined codes where corresponding information has not been initially set.

In such an information setting device, information corresponding to each code of the coded information is stored and a memory means capable of overwriting is provided having an information storage area for undefined codes where information has not been set, from which information corresponding to the code read by the code read-in means is read and stored in the camera.

A further embodiment of the present invention provides an information setting device of a camera wherein it is possible to connect to the information setting device an information writing device external from a camera to write information in the information recording area of the memory means for the undefined codes.

In this embodiment, an external information writing device is connected to the information setting device to write information in the information recording area of the memory means for the undefined codes and the information is then set for undefined codes, thereafter enabling a similar treatment in the information setting device for undefined codes and defined codes.

Alternatively, an information writing device may be provided internally in a camera to write information in the information recording area of the memory means for the undefined codes. Here, the information is set for undefined codes by means of an information inputting means to receive information corresponding to undefined codes and an information writing device to write information for the undefined codes in the information recording area of the memory means, and makes it possible for the undefined codes to be recognized in a manner similar to the defined codes.

In a second aspect of the invention, an information setting device of a camera which sets information corresponding to codes read-in by the code reading means in the camera comprises a first memory means which exclusively reads out and stores information corresponding to the defined codes where information is set, a second overwritable memory means which has an information storage area for undefined codes where information has not been set, and an information reading means to read information corresponding to the read-in codes from the first memory means if the read-in codes of the code read-in means are defined codes and to read information corresponding to the read-in codes from the second memory means if the read-in codes are undefined codes.

In this information setting device, the information corresponding to the defined codes where information is set is recorded in the first memory device which exclusively reads out and the information storage area for undefined codes where corresponding information has not been set is provided in the second overwritable memory means. Information corresponding to the read-in codes is read from the first memory means if the codes read-in by the code read-in device are defined codes, and information corresponding to the read-in codes is read from the second memory means if the codes read-in by the code read-in device are undefined codes, and the information is set in the camera.

A further embodiment of this second aspect of the invention provides an information setting device of a camera wherein it is possible to connect an external information writing device to the information setting device in order to write information for the undefined codes in the information recording area of the second memory means. In this embodiment, an external information writing device is connected to the information writing device to write information for the undefined codes in the information recording area of the second overwritable memory means, thereby setting information for undefined codes and making it possible for the undefined codes to be recognized similar to the defined codes.

Alternatively in this second aspect, an information writing device may be provided internal to the camera to write information for the undefined codes in the information recording area of the second memory means. Here, the information is set for undefined codes by means of an information inputting means to receive information corresponding to undefined codes and an information writing device to write information for the undefined codes in the information recording area of the second overwritable memory means, and makes it possible for the undefined codes to be recognized in a manner similar to the defined codes.

The code read-in means of the information setting device of a camera reads codes which are recorded optically, magnetically, or electrically. The codes of an information setting device of a camera are correspondingly recorded, for example, on film or on a film cartridge. These recorded codes are read by the code read-in means.

In a third aspect of the invention, an information setting device of a camera further comprises a control device which executes a temporary process if an initial value indicating that undefined data is received from the information storage area for the undefined codes, and which executes a permanent process if data different from the initial value(s) are received.

For example, in one embodiment, an information setting device of a camera displays a warning as a temporary process by means of the control device. In another embodiment, an information setting device of a camera displays 0 for the number of shootable frames as a temporary process by means of the control device.

DETAILED DESCRIPTION OF PREFERRED EMBODIMENTS

Figure 1:
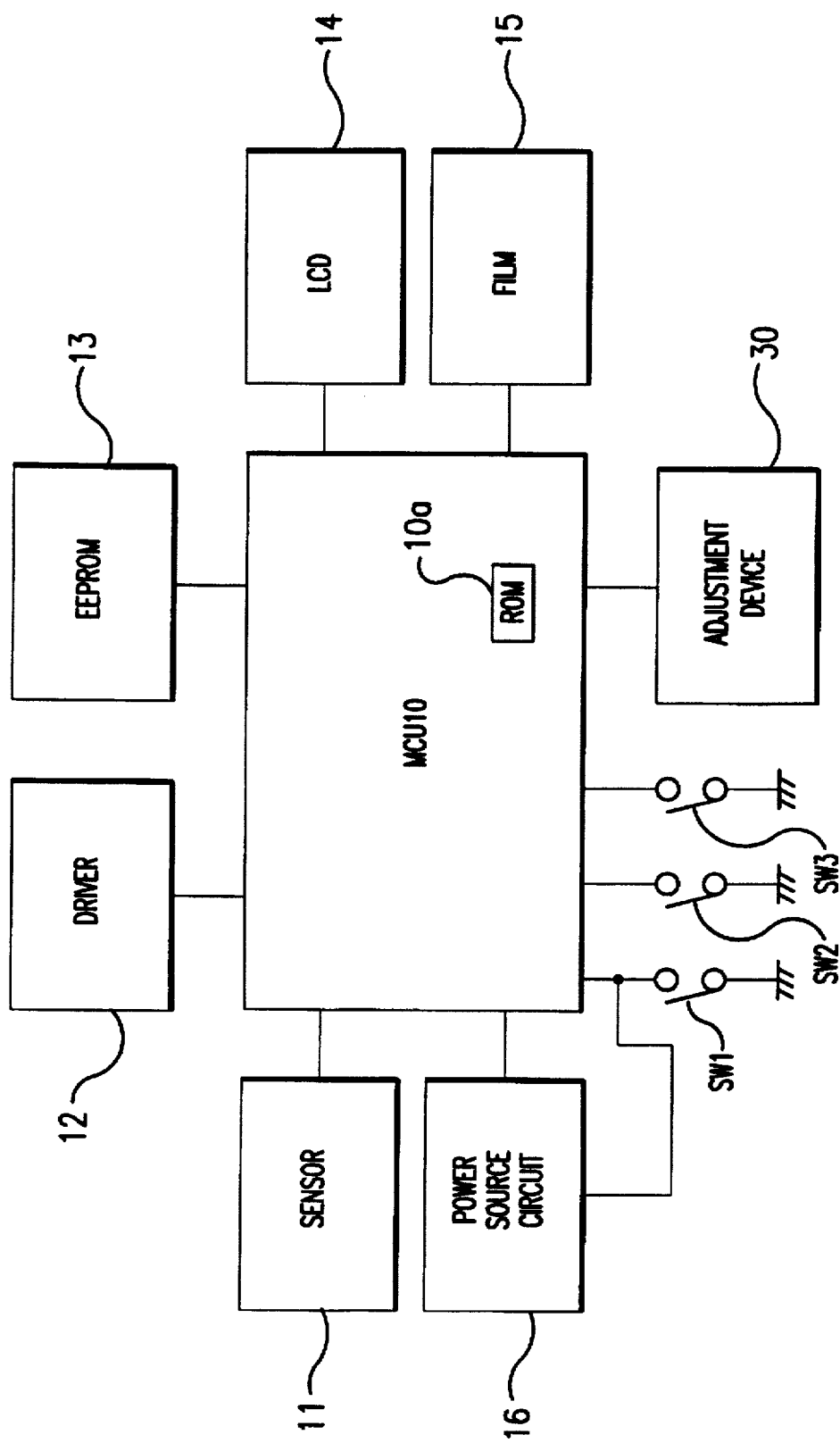
FIG. 1 is a functional block diagram describing a structure of an embodiment.

FIG. 1 is a functional block diagram describing the structure of a camera with an information setting device of an embodiment. Here, in this embodiment, an example is shown wherein information relating to the film which is recorded beforehand in the film or film cartridge is set in the camera.

Microcomputer unit (hereafter, MCU) 10 is composed of peripheral parts such as a CPU (not shown) and ROM 10a and executes sequence control and various algorithms of the camera including reading and setting of film information. The defined codes indicating the number of shootable frames shown in Table 2 and the information on the number of shootable frames corresponding to each of the defined codes is stored in the MCU 10 and the ROM 10a to be embedded.

TABLE 2

| Code | ROM |
|---|---|
| 1 | 12 |
| 2 | 20 |
| 3 | 24 |
| 4 | 36 |
| 7 | 72 |

A sensor 11 comprises a set information input circuit from the information setting member, a photometry sensor to measure the illuminance of an object, a distance measurement sensor to measure the shooting distance to the object, a lens information input circuit to input information from the lens and the like, and inputs the set information, photometric information, distance measurement information, lens information and the like to the MCU 10. A driver 12 comprises a motor and its driving circuit and drives the focus adjustment motor, the film feeding motor and the like according to the driving command from the MCU 10.

An EEPROM (electrically erasable programmable read only memory) 13 is a non-volatile, overwritable memory for storing various information and maintains the memory contents even after the power is interrupted for the camera. Undefined codes of the number of shootable frames indicated in Table 3 are recorded in the EEPROM 13. Thus, the memory area of the number of shootable frames for each undefined code is secured. In the present embodiment, for example, the initial value 0 is stored in the EEPROM 13 during the manufacturing or shipping of the camera for the number of shootable frames corresponding to the undefined codes.

TABLE 3

| Code | EEPROM (initial) |
|---|---|
| 5 | 00 |
| 6 | 00 |

In this example, the initial values of undefined codes at the time of shipment from the plant are set 0, but the initial values of undefined data may be determined according to the type of coded information.

LCD 14 comprises a display unit and its driving circuit and displays various information according to the display command from the MCU 10. A film information reading device 15 reads the film information recorded on the film cartridge mounted and outputs it to the MCU 10. The film information includes ISO sensitivity, latitude and the number of shootable frames, which are coded and recorded as described in Table 1, for example. The film information can be recorded optically as bar codes or magnetically by providing a magnetic recording unit. The film information also can be recorded electrically by installing an EEPROM inside the film cartridge. A circuit and equipment matching the recording method of the film information is provided in the film information reading device 15. For example, an optical reading head with a retrieval circuit is provided for the optical recording method, and a magnetic head with a retrieval circuit is provided for the magnetic recording method. Moreover, a connection terminal with a retrieval circuit is provided for the electric recording method.

A switch SW1 is a half-depression switch which closes with the first stroke of a release button (not shown) while a switch SW2 is a release switch which closes with the second stroke of the release button. A switch SW3 is an opened back-cover detection switch which closes when the back cover is closed after mounting of the film. A power source circuit 16 supplies stabilized power source to all the circuits in the camera by closing the half-depression switch SW1, and continues supplying power for a specified amount of time, eight seconds, for example, by the command from the MCU 10 even after opening of the half-depression switch SW1. An adjustment device 30 is connected to MCU 10 during the manufacturing process and/or service and executes overwriting of information for undefined codes stored in the EEPROM 13 and the like.

Figure 2:
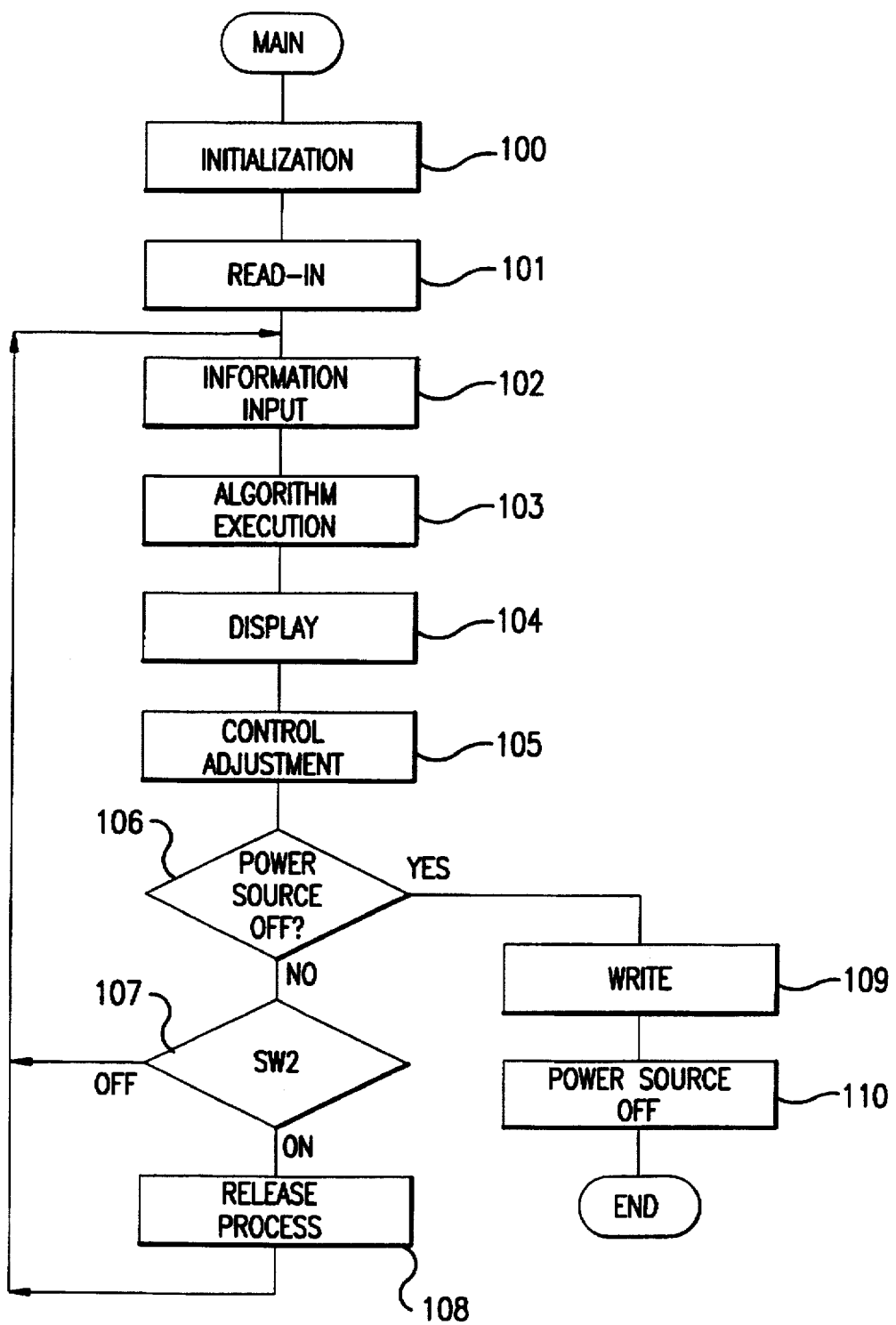
FIG. 2 is a flow chart describing the main program of the microcomputer of an embodiment.

FIG. 2 describes a flow chart showing the main program of the MCU 10.

When the half-depressed switch SW1 closes with the pushing of the release button, the power source circuit 16 starts up to supply stabilized power source to all the circuits including the MCU 10, and the power-on-reset function of MCU 10 is enabled to start execution of the main program described in FIG. 2.

At step 100, an internal memory and input/output port are initialized, and then the program moves to step 101. At step 101, adjustment data and setting data recorded in the EEPROM 13 are read into a RAM in the MCU 10. At step 102, setting information, photometry information, distance measurement information, lens information and the like from the sensor 11 are input and the exposure algorithm and distance measurement algorithm are executed at the next step 103. Then at step 104, the resulting exposure value(s) and the focus adjustment state from the algorithms are displayed and at the next step 105, the focus adjustment motor is driven by the driver 12 based on the results of the algorithm and the focus adjustment state and the focus adjustment of the shooting lens is accomplished.

At step 106, a determination is made as to whether or not states are established to turn off the power source. In other words, a determination is made as to whether or not eight seconds has elapsed since the operation unit of the camera including the half-depressed switch SW1 ended its operation with an affirmative response causing the program to move to step 109, otherwise to step 107.

At step 107, determination is made as to whether or not the release button is operated to the second stroke and fully depressed, thereby closing the switch SW2. If the switch SW2 is closed, the program moves to step 108, otherwise returning to step 102. If the shutter is released, the program executes the release process at step 108. In other words, the program drives the driver 12 and executes shutter control according to the exposure value resulting from the algorithm and, in addition, raises and lowers a mirror, charges the shutter, controls the feeding of the film and updates the count of the film counter.

On the other hand, if the states for turning off the power source are established, at step 109, information which is set and updated by the information setting unit of the sensor 11 and the like is written in the corresponding area of the EEPROM 13. At the next step 110, the supply of power to the circuits and equipment of the camera is halted by stopping operation of the power source circuit 16. With this, the operation of the MCU 10 also is stopped.

Figure 3:
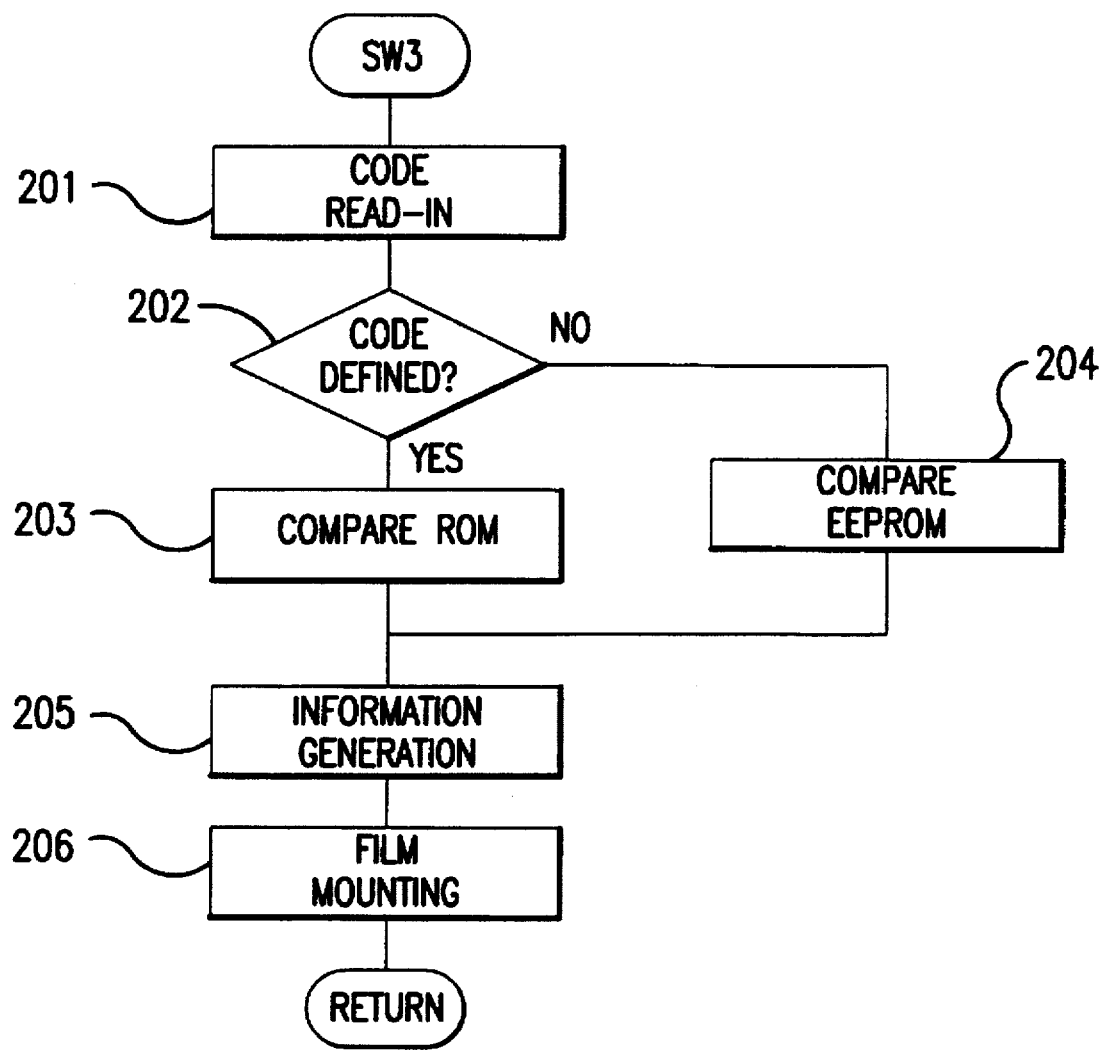
FIG. 3 is a flow chart describing an interruption routine to be executed when the back cover of the camera is closed.

After the back cover is closed and the open back cover detection switch SW3 is closed, the MCU 10 is interrupted and the MCU 10 executes a routine described in FIG. 3.

At step 201, codes recorded on the film cartridge are read by the film information reading device 15. These codes indicate information on the film such as ISO sensitivity, latitude, and the number of shootable frames. At step 202 the codes which are read are compared to the defined codes, for example of Table 2, which are stored in ROM 10a to determine whether or not the codes read are defined codes. If the codes read are one of defined codes 1–4, 7, the program moves to step 203, and if the codes are undefined codes 5, 6 the program moves to step 204.

If the codes read are defined codes, the number of shootable frames corresponding to the codes read is determined at step 203 by comparing the codes read to the information regarding the number of shootable frames of Table 2 which is stored in ROM 10a of the MCU 10. Then the number of shootable frames corresponding to the codes read is set to the reverse counter of the film counter.

If the codes read are undefined codes, on the other hand, the number of shootable frames corresponding to the codes read is determined at step 204 by comparing the codes read to the information relating to the number of shootable frames, for example, of Table 3, which is stored in EEPROM 13. Here, the reverse counter of the film counter would be set to 0 since the number of the shootable frames of the undefined codes is set to 0 at the time of manufacturing or shipping of the camera.

At step 205, other information corresponding to codes which are read is generated. In other words, the ISO sensitivity and the latitude for the codes read are determined. From this information, information corresponding to the defined codes are stored in ROM 10a, and such information as the number of shootable frames and other information corresponding to undefined codes is stored in EEPROM 13. At the next step 206, a film feeding motor (not shown) is driven by the driver 12 and the first frame is set at the predetermined shooting position.

Figure 4:
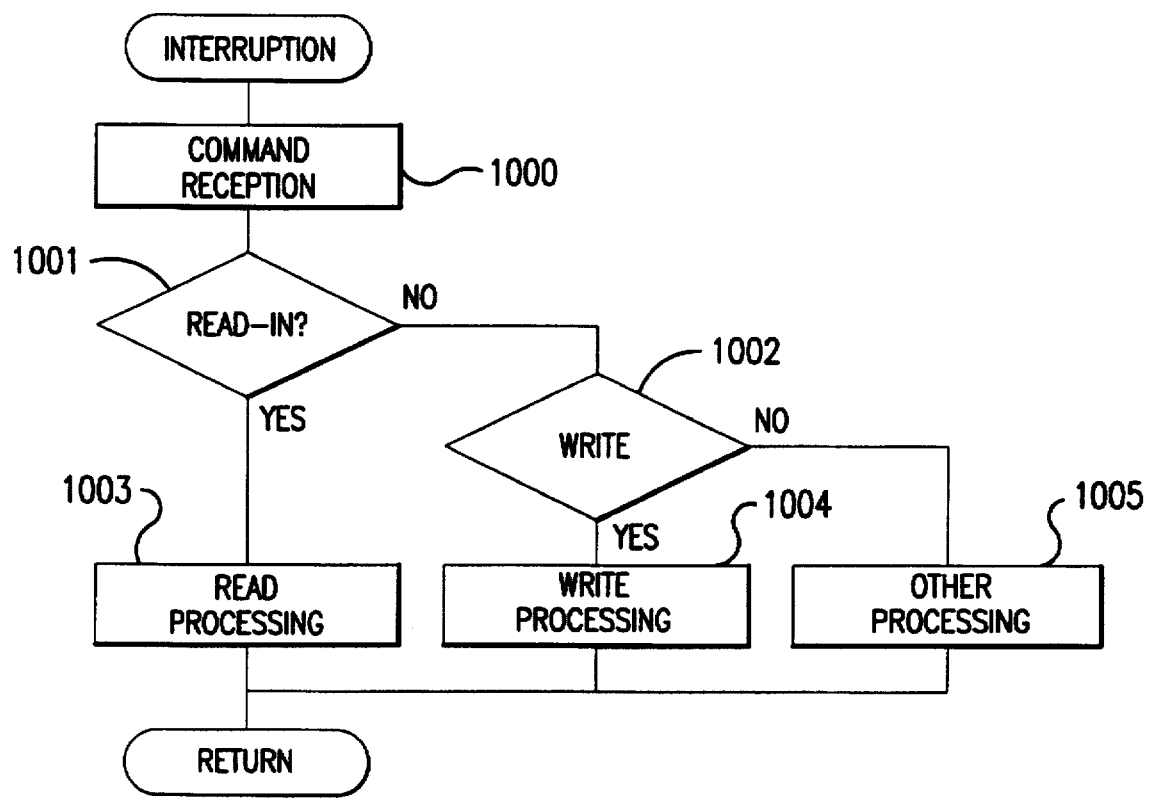
FIG. 4 is a flow chart describing a communication interruption routine of an adjustment device.

Upon connecting an external adjustment device 30 to the MCU 10, the MCU 10 is interrupted and the MCU 10 executes an interruption routine described in FIG. 4. At step 1000, a command from the adjustment device 30 is received. At the next step 1001, a determination is made as to whether or not the command received is the data read command from the EEPROM 13. If it is the read command, the program moves to step 1003, otherwise to step 1002. At step 1002, a determination is made as to whether or not the command received is the data write command for the EEPROM 13. If it is the data write command, the program moves to step 1004, otherwise to step 1005.

If the data read command is received, the data reading process of the data from the EEPROM 13 is executed at step 1003. In other words, the data stored in the EEPROM 13 are transferred to the adjustment device 30 according to the command address and the number of data which follow the read command. If the data write command is received, however, the data write process of the data to the EEPROM 13 is executed at step 1004. In other words, the data are written into the EEPROM 13 according to the command address and the number of data which follow the write command. For example, in writing the number of the shootable frames for the undefined codes 5 or 6, the number of shootable frames is written in the EEPROM 13 according to the address and the data number of the undefined codes 5 or 6 which follow the write command. If the data is neither the data read command nor the data write command, a process corresponding to the command is executed at step 1005.

As explained above, by connecting the adjustment device to the camera and overwriting the data in the EEPROM 13, codes 5 and 6 of Table 3 which are initially undefined at the time of manufacturing the camera may be newly defined by setting the number of shootable frames.

At the time of manufacturing the camera, codes 5 and 6 are undefined, hence, if the read code is either undefined code 5 or 6, the undefined code data of the EEPROM 13 described in Table 3 are compared at step 204 in FIG. 3, and the initial value 0 corresponding to undefined code 5 or 6 is set for the reverse counter. However, this means that the film counter remains 0 until the shooting of the film is completed.

At the time when a film with new specifications corresponding to undefined codes is provided, the specification and the code of that film are known, hence, the undefined code data in the EEPROM 13 may be overwritten to corresponding data for the new film using the adjustment device 30, for example by a technician at a service center. By doing this, the undefined code data are overwritten as described in Table 4, after which undefined codes 5 and 6 are processed in the camera similar to the defined codes with the execution of steps 204 and 205 in FIG. 3 and the number of shootable frames corresponding to code 5 or 6 is set in the reverse counter of the film counter.

TABLE 4

| Code | EEPROM (example 1) | EEPROM (example 2) | EEPROM (example 3) |
|---|---|---|---|
| 5 | 00 | 30 | 30 |
| 6 | 45 | 00 | 45 |

The present invention may also be applied to other undefined film information and undefined functions of a camera besides the number of the shootable frames, for example information regarding ISO sensitivity and the latitude so that such information also may be newly defined.

Another Example of the Invention

In the embodiment described above, an example is shown wherein the defined code data are stored in read only memory ROM 10a at the time of manufacturing of the camera and the undefined code data are stored in the overwritable non-volatile memory EEPROM 13. A modification of the above embodiment is where both defined code data and undefined code data are stored in the overwritable non-volatile memory EEPROM 13.

Figure 5:
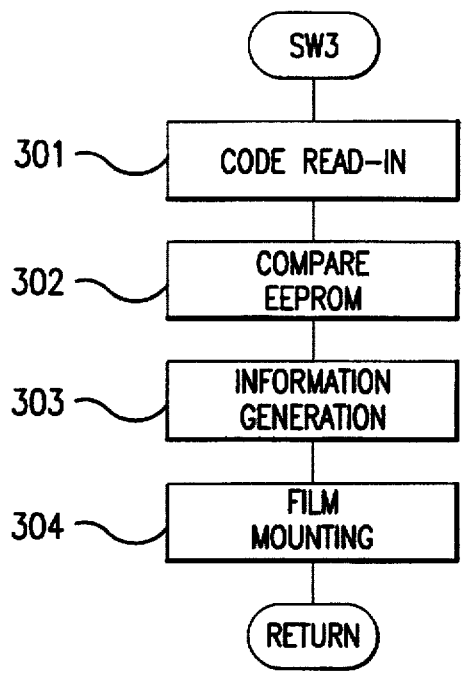
FIG. 5 is a flow chart describing a modified example of an interruption routine to be executed when the back cover of the camera is closed.

FIG. 5 is a flow chart describing a back cover closing interruption routine. At step 301, the codes recorded in the film cartridge are read by the film information read-in device 15. These codes indicate information on the film such as ISO sensitivity, latitude and the number of shootable frames. At the next step 302, the data shown in Table 5 which are stored in the EEPROM 13 are compared and the number of shootable frames corresponding to the read codes is determined.

TABLE 5

| Code | Initial | Example 1 | Example 2 | Example 3 |
|---|---|---|---|---|
| 1 | 12 | 12 | 12 | 12 |
| 2 | 20 | 20 | 20 | 20 |
| 3 | 24 | 24 | 24 | 24 |
| 4 | 36 | 36 | 36 | 36 |
| 5 | 00 | 00 | 30 | 30 |
| 6 | 00 | 45 | 00 | 45 |
| 7 | 72 | 72 | 72 | 72 |

At the time of manufacturing the camera, codes 1, 2, 3, 4, and 7 are set with the number of shootable frames 12, 20, 24, 36 and 72, respectively. On the other hand, codes 5 and 6 are undefined and the number of shootable frames is set to 0.

At step 303, ISO sensitivity and the latitude corresponding to the read codes are determined. At the next step 304, the first frame is set at the predetermined position by driving an unrepresented film feeding motor by the driver 12.

Next, if a film with a new specification for undefined codes is provided, the undefined codes of the EEPROM 13 corresponding to the new film may be written over by the external adjustment device 30 at the service center as described above. An example is shown in which the undefined codes 5 and 6 are overwritten with the data in the columns of Table 5 under "Example 1", "Example 2", and "Example 3". By so doing, the codes 5 and 6 indicating the number of frames may be processed as defined codes like the previous embodiment and the number of frames corresponding the code 5 or 6 is set in the reverse counter of the film counter.

In this modified example, the process is simpler than the previous embodiment in which the defined code data are stored in ROM 10a and the undefined code data are stored separately in the EEPROM 13. On the other hand, in the previous embodiment, the process is more complicated but the defined code data at the time of manufacturing is stored in the ROM 10a, which makes the process safer because the data is not changed after manufacturing.

Another Example of a Modification

Figure 6:
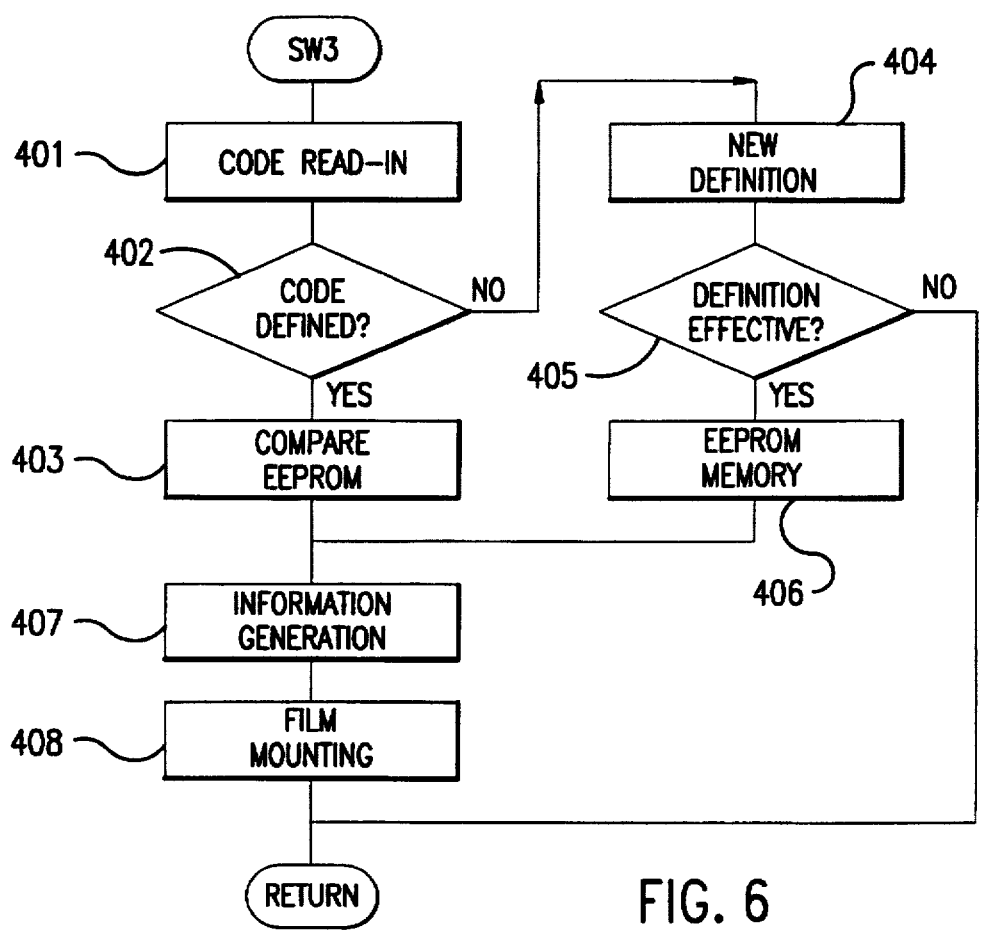
FIG. 6 is a flow chart describing another modified example of an interruption routine to be executed when the back cover of the camera is closed.

FIG. 6 is a flow chart describing a closed back cover interruption routine in another example of the invention.

At step 401, codes recorded on the film cartridge are read by the film information reading device 15. These codes indicate information on the film such as ISO sensitivity, latitude, and the number of shootable frames. At the next step 402, the codes which are read are compared to the number of shootable frames data displayed in Table 5 of the EEPROM 13 to determine whether or not the read codes are defined. If the read codes are defined, the program moves to step 403, otherwise to step 404. As described in the column under "Initial" in Table 5, 0 is set for codes 5 and 6 at the time of manufacturing the camera, and these codes are considered undefined. On the other hand, since the number of shootable frames are set non-zero in the codes 1–4 and 7, these codes are considered defined.

Figure 7:
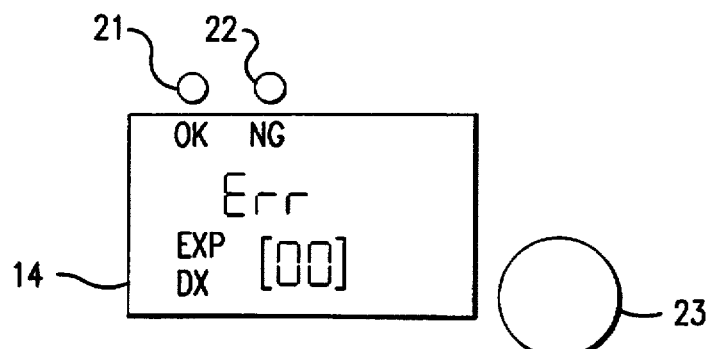
FIG. 7 illustrates a display format of the LCD.

If the read codes are defined, the number of shootable frames corresponding to the read codes is determined at step 403 by comparing with the EEPROM 103 and is set in the reverse counter of the film counter. On the other hand, if the read codes are not defined, the program asks the user at step 404 whether or not the number of shootable frames should be newly defined by displaying a screen, for example as shown in FIG. 7, on the LCD 14. In other words, the number of shootable frames "00" is flashed on the film counter unit of the LCD 14, and at the same time the display segment "DX" and "EXP" are flashed, enabling the change of the number of the shootable frames, for example by the command dial 23. When the number of shootable frames flashing coincide with the number of the shootable frames of the new film and the user operates the setting button 21, the display segment "OK" is flashed indicating that the setting of the number of shootable frames is completed. However, if the user stops the setting of a new number of shootable frames by operating the setting cancellation button 22, the display segment "NG" is flashed indicating that the setting of the new number of shootable frames is stopped.

At step 405, a determination is made as to whether or not the definition is effective. If the setting button 21 is operated, the program moves to step 406 and if the setting cancellation button 22 is operated, the program cancels the process and returns. At step 406, the number of shootable frames newly established is stored in the EEPROM 13. For example, the number of shootable frames "30" is selected for the undefined code 5 by the command dial 23, and if the setting button 21 is operated with the number of shootable frames "30" flashing on LCD 14, the number of shootable frames 30 is newly stored in the undefined code 5 of the EEPROM 13 as described in the "Example 2" column of Table 5. Hence, when film containing the same coded information is mounted again, the number of shootable frames 30 is stored in the code 5 and the program moves from step 402 to step 403, treating the codes as defined codes.

If the read codes are not defined and the setting of the new number of shootable frames is cancelled, the program returns from step 405 without the feeding of film. Hence, the user may remove the film from the camera, verify the label and the like on the cartridge, and try the above process again.

As explained above, setting of the number of shootable frames for undefined codes by the camera itself is made possible, hence, a new film can be handled without taking the camera to a service center. Moreover, if the user makes a mistake in setting the number of shooting frames, the number of shooting frames may be corrected with an external adjustment device 30 connected at a service center.

Example of Another Modification

Figure 8:
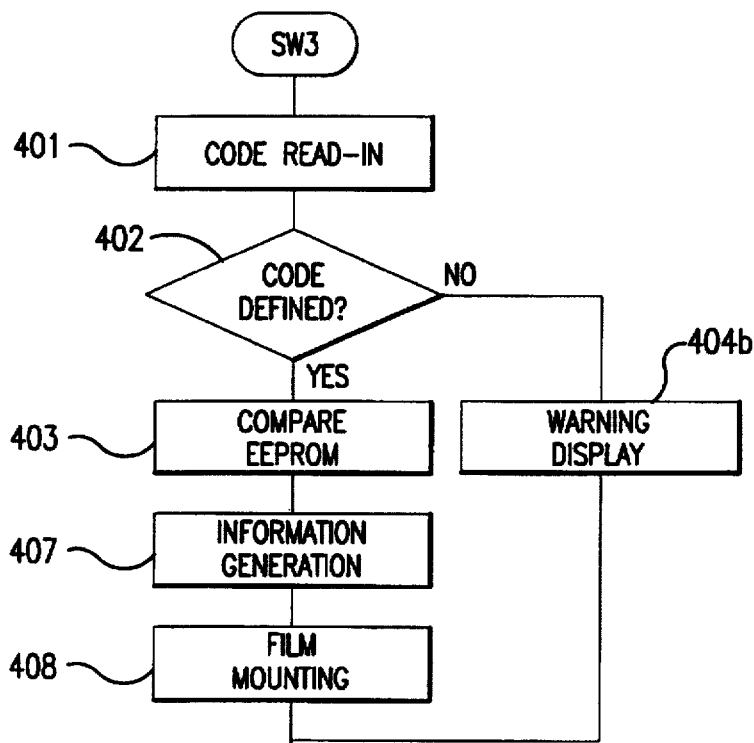
FIG. 8 is a flow chart describing another modified example of an interruption routine to be executed when the back cover of the camera is closed.

FIG. 8 is a flow chart describing a back cover closing interruption routine in another modified example of the invention. Here, the steps which perform the same steps of the interruption routine described in FIG. 6 are identified with the same step numbers and mainly the different steps will be explained.

Figure 9:
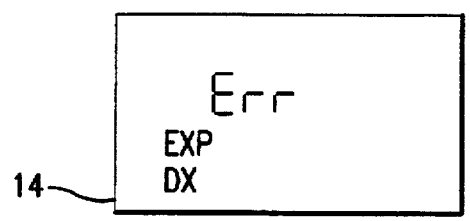
FIG. 9 illustrates another display format of the LCD.

If the read codes are not defined, display segments "DX", "EXP" and "Err" are flashed in LCD 14, as illustrated in FIG. 9, to send a warning at step 404b. In other words, setting a new number of shootable frames for undefined codes is prohibited. Thus, problems that might arise by the user setting new numbers are avoided, and the setting of new numbers for undefined codes is accomplished without fail at a service center.

In the structures of above embodiments, a code read-in means in represented by a film information reading device 15, the first memory means is represented by the ROM 10a, the EEPROM 13 represents a memory means and a second memory means, the microcomputer unit MCU 10 represents an information reading means, the adjustment device 30 represents an information writing device, and the microcomputer unit MCU 10, LCD 14, setting button 21 and command dial 23 represent an information inputting means, respectively.

As explained above, in a first embodiment, the information corresponding to each code of the coded information is stored, an overwritable memory means with information storage area for undefined codes where the information is not set is provided, and the information corresponding to codes which are read by the code read-in means is read from the memory means and is set in the camera. Hence, the information is set for the undefined codes, which will be treated like defined codes, enabling the handling of a new specification which is undefined at the time of manufacturing the camera.

It is possible to connect an information writing device which writes information in the information recording area for undefined codes of the memory means. Hence the information is set in undefined codes so as to be thereafter treated like defined codes, enabling the handling of new film specifications which are undefined at the time of manufacturing the camera. Moreover, by connecting a writing device in service centers for a camera and by limiting the handling of the writing device to experienced engineers, the secure and sure execution of the information setting process for undefined codes are ensured.

Alternatively, an information inputting means to receive information corresponding to undefined codes and an information writing device to write information in the information recording area of the undefined codes in the memory means is provided in the information setting device of a camera. Hence, the information is set for undefined codes so as to be treated like defined codes, enabling handling of thereafter new film specifications which are undefined at the time of manufacturing the camera. Moreover, it is not necessary to take the camera to a service center where a writing device is installed in executing information setting process of the undefined codes.

In another embodiment, information corresponding to defined codes where information is set is stored in read only first memory means, an information storage area for undefined codes where information is not set is provided in the overwritable second memory means, and if the codes read by the code read-in means are defined codes, information corresponding to read code is read from the first memory means while, if the read codes are undefined codes, information corresponding to read codes is read from the second memory means and is set in the camera. Hence, the information is set for the undefined codes, so as to thereafter be treated like defined codes, enabling handling of a new specification which is undefined at the time of manufacturing the camera. Moreover, because information of defined codes are stored in the read only first memory means, accidental overwriting of information for defined codes during information setting processing of undefined codes is eliminated, resulting in safe operation.

For this embodiment, connection of an external information writing device to write information in the information recording area for the undefined codes of the overwritable second memory means is made possible. Hence, the information is set for undefined codes, which thereafter can be treated like defined codes, enabling the handling of a new specification which is undefined at the time of manufacturing the camera. Moreover, by connecting a writing device in service centers for a camera and by limiting the handling of the writing device to experienced engineers, the secure and sure execution of information setting processes for undefined codes is ensured.

Alternatively, an information inputting means to receive information corresponding to undefined codes and an information writing device to write information in the information recording area of the undefined codes in the memory means is provided in the information setting device of a camera. Hence, the information is set for undefined codes, which can thereafter be treated like defined codes, enabling handling of a new specification which is undefined at the time of manufacturing the camera. Moreover, it is not necessary to take the camera to a service center where a writing device is installed in executing information setting process of the undefined codes.

A code read-in means can be made to read codes which are recorded optically, magnetically or electrically. Hence, various recording methods of codes can be handled.

Also, a code read-in means can be made to read codes which are recorded on the film or film cartridge. Hence, various coded information concerning the film can be set in the camera.

In the invention, whether or not the undefined codes are initial values can be determined automatically before processing. Hence, undefined codes can be handled without special operation by the user. A warning can be displayed as a temporary process, enabling the user to recognize that the undefined code is an initial value. Also, the number 0 can be displayed for the number of shootable frames as a temporary process, enabling the user to recognize that the undefined code is an initial value.

What is claimed is:

1. An information setting device of a camera comprising:
   a code read-in device to read codes representing characteristics of a recording medium,
   a memory device to store information corresponding to the codes, wherein said memory device comprises at least a first memory device which exclusively stores and reads out information corresponding to defined codes for which information has been set and a second overwritable memory device which has an information storage area for undefined codes for which information has not been set,
   an information read-out device to read from the memory device information corresponding to the defined codes read in by the code read-in device, and
   an information writing device to write information for the undefined codes in the information storage area of the second overwritable memory device to thereby define the undefined codes after the information corresponding to the defined codes has been stored in the first memory device,
   wherein the information read from the information read-out device is set in the camera.

2. An information setting device according to claim 1, wherein the codes represent an amount of recordable space of a recording medium.

3. An information setting device according to claim 1, wherein the information writing device is an external information writing device connected to said information setting device.

4. An information setting device according to claim 1, wherein the information writing device is provided in the camera.

5. An information setting device according to claim 4, further comprising an information inputting member to receive information corresponding to an undefined code.

6. An information setting device according to claim 1, wherein said information read-out device reads information corresponding to the codes read in by the code read-in device from the first memory device if the read-in codes are defined codes and reads information corresponding to the codes read in by the code read-in device from the second memory device if the read-in codes are undefined codes.

7. An information setting device according to claim 1, wherein the code read-in device reads codes which are recorded optically, magnetically, or electrically.

8. An information setting device according to claim 7, wherein the codes to be read are recorded on a film or a film cartridge.

9. An information setting device according to claim 1, further comprising a control device which executes a temporary process if an initial value is received from the information storage area for the undefined codes indicating undefined data and otherwise executes a permanent process.

10. An information setting device according to claim 9, wherein the temporary process executed by the control device comprises the display of a warning indicating undefined codes.

11. An information setting device according to claim 9, wherein the temporary process executed by the control device comprises the display of 0 for the number of shootable frames.

12. An information setting device of a camera comprising:
    code read-in means to read codes representing characteristics of a recording medium,
    memory means to store information corresponding to the codes, wherein said memory means comprises at least a first memory means which exclusively reads out and stores information corresponding to defined codes for which information has been set and a second overwritable memory means which has an information storage area for undefined codes for which information has not been set,
    information read-out means to read from the memory means information corresponding to the codes read in by the code read-in means, and
    information writing means to write information for the undefined codes in the information storage area of the second overwritable memory means to thereby define the undefined codes after the information corresponding to the defined codes has been stored in the first memory means,
    wherein the information read from the information read-out means is set in the camera.

13. An information setting device according to claim 12, wherein the information writing means is an external information writing means connected to said information setting device.

14. An information setting device according to claim 12, wherein the information writing means is provided in the camera.

15. An information setting device according to claim 14, further comprising information inputting means to receive information corresponding to an undefined code.

16. An information setting device according to claim 12, wherein the codes represent an amount of recordable space of a recording medium.

17. A method for setting an undefined code representing characteristics of a recording medium in a camera having defined codes set in an information storage area of a first memory device, comprising providing information corresponding to said undefined code to an information writing device, and writing said code and corresponding information into an information storage area of a second overwritable memory device, thereby setting the code in the camera after the defined codes are set in the information storage area of the first memory device.

18. A method for setting an undefined code in a camera according to claim 17, wherein said information writing device is external to said camera, and said writing is effected by connecting said external information writing device to said second overwritable memory device of the camera.

19. A method for setting an undefined code in a camera according to claim 17, wherein said information writing device is contained in the camera, said process further comprising initially reading recorded codes with a read-in device and determining that said code is undefined in the information storage area of the second overwritable memory device, indicating on a display device that said code is undefined, accepting input information corresponding to the undefined code, and writing said code and corresponding information into the information storage area of the second overwritable memory device with said information writing device, thereby setting the code in the camera.

20. A method for setting an undefined code in a camera according to claim 19, wherein said reading of recorded codes is done optically, magnetically, or electrically.

21. A method for setting an undefined code in a camera according to claim 20, wherein the recorded codes are recorded on a film or a film cartridge.

* * * * *